US012037232B2

(12) United States Patent
Haifeng et al.

(10) Patent No.: US 12,037,232 B2
(45) Date of Patent: Jul. 16, 2024

(54) AIR PRESSURE OPENER FOR OPENING WINE BOTTLE

(71) Applicant: Zheng Yutong, Shanghai (CN)

(72) Inventors: Luo Haifeng, Guangxi (CN); Zhu Haihong, Guangdong (CN)

(73) Assignee: Zheng Yutong, Shanghai (CN)

( * ) Notice: Subject to any disclaimer, the term of this patent is extended or adjusted under 35 U.S.C. 154(b) by 35 days.

(21) Appl. No.: 17/042,674

(22) PCT Filed: Mar. 18, 2020

(86) PCT No.: PCT/CN2020/080059
§ 371 (c)(1),
(2) Date: Sep. 28, 2020

(87) PCT Pub. No.: WO2021/077666
PCT Pub. Date: Apr. 29, 2021

(65) Prior Publication Data
US 2023/0113838 A1 Apr. 13, 2023

(30) Foreign Application Priority Data
Oct. 21, 2019 (CN) ........................ 201921768985.7

(51) Int. Cl.
*B67B 7/08* (2006.01)

(52) U.S. Cl.
CPC .................................... *B67B 7/08* (2013.01)

(58) Field of Classification Search
CPC .. B67B 7/06; B67B 7/066; B67B 7/08; B67B 7/18; B67B 7/182; B67B 7/24; B67B 7/385; B67B 7/42; B67B 7/44; B65D 51/16; B65D 51/1661; B65D 51/1683; B65D 51/1688
See application file for complete search history.

(56) References Cited

U.S. PATENT DOCUMENTS

| | | | | |
|---|---|---|---|---|
| 5,005,446 A * | 4/1991 | Mackey | B67B 7/08 141/19 |
| 2005/0076741 A1* | 4/2005 | Chan | B67B 7/08 81/3.2 |

FOREIGN PATENT DOCUMENTS

| | | |
|---|---|---|
| CN | 101759127 | * 11/2010 |
| JP | S5983799 | * 6/1984 |

* cited by examiner

*Primary Examiner* — Robert J Scruggs
(74) *Attorney, Agent, or Firm* — Boyle Fredrickson, S.C.

(57) ABSTRACT

The invention provides an air pressure opener for opening grape wine bottle. It comprises a housing and an air pumping device for filling air into the wine bottle. The air pumping device comprises a cavity inside the housing and an air needle with an air channel. The head of the air needle is connected to the inner cavity of the housing, and the air passage in the air needle communicates with the inner cavity of the housing. It is characterized in that an air pressure relief device is provided that releases air from the inner cavity when the air pressure in the inner cavity of the housing rises from atmospheric pressure value to a certain value. When the bottle is opened, the air pressure relief device timely vents the air in the bottle to prevent the bottle from bursting from the excessive air pressure in the wine bottle.

4 Claims, 6 Drawing Sheets

-- PRIOR ART --

AIR PRESSURE OPENER FOR OPENING WINE BOTTLE

FIELD OF THE INVENTION

This utility model is in the field of wine utensils, and relates to an air pressure opener for opening grape wine bottle.

BACKGROUND OF THE INVENTION

Currently, most of the pressure openers for opening grape wine bottle in the market are shown in FIG. 1. When using this type of air pressure opener to open the grape wine bottle, the air needle is inserted into the wine bottle. Like a pump, the housing moves up and down repeatedly to push the air into the wine bottle and then push the wine stopper out by using air pressure. However, it is not easy to control the amount of air pumped into the bottle in this way. Sometimes, too much air may be pumped into the bottle and causes the bottle burst dangerously if the wine stopper tightly fills into the bottle and therefore not easy to be pushed out of the bottle. The current technology lacks the air relief function to prevent bottle bursting.

SUMMARY OF THE INVENTION

This utility model provides an air pressure opener for opening grape wine bottle, which comprises a housing and an air pumping device for filling air into the wine bottle. The air pumping device comprises a cavity inside the housing and an air needle with an air channel. The head of the air needle connects to the inner cavity of the housing, and the air channel in the air needle connects the inner cavity of the housing. This utility model is characterized in that an air relief device is provided in the inner cavity of the housing, and when the value of air pressure in the inner cavity of the housing rises from atmospheric pressure to a certain value, the air pressure relief device can release the air pressure in the inner cavity of the housing.

the air pressure relief device comprises a venting valve, a spring, a sealing ring and a venting hole, the venting valve is fixedly installed at the bottom of the spring, and the venting hole is provided at the bottom of the air pressure relief device, a sealing ring is also provided at the bottom of the venting valve. When the air pressure value of the inner cavity of the housing does not reach a value capable of ejecting the venting valve, the venting valve tightly fits with the venting hole through the sealing ring under the action of the spring force. When the air pressure value of the inner cavity of the housing reaches a value capable of ejecting the venting valve, the spring can be compressed. The venting valve. and the venting hole can be opened under the air pressure of the inner cavity of the housing. By this way, the air pressure in the inner cavity of the housing is released.

The housing comprises an outer housing and an inner housing. A piston ring is arranged between the top side wall of the inner housing and the outer housing, and a one-way valve is provided on the top of the inner housing.

When the bottle opener works, an air intake space is formed between the top of the inner housing and the outer housing. The piston ring controls the air flowing into the air intake space, and the one-way valve controls the air flowing into the inner cavity of the housing in one direction.

The air pressure relief device is disposed on the side wall of the inner cavity of the housing, the inner side wall of the housing is provided with an air outlet, and the air pressure relief device connects to the outlet.

A sleeve of bottle opener is provided at the bottom of the bottle opener, and the air needle is accommodated in the sleeve of bottle opener; When grape wine bottle is being opened, the bottle opener is set on the bottle mouth, and the air needle is inserted into the grape wine bottle through the bottle stopper.

The innovative points of this utility model are as follows: An air relief device is provided in the air pressure opener. When the bottle is being opened, the air pumping device pushes a large amount of air, but not opening the stopper. At this time, if the air is continuously being pumped into the bottle, the bottle may burst because of high air pressure in the wine bottle. In this context, the air relief device releases the air pressure in the bottle in time. Therefore, the present utility model ensures that the wine bottle will not burst when the bottle is being opened.

Figure 1:
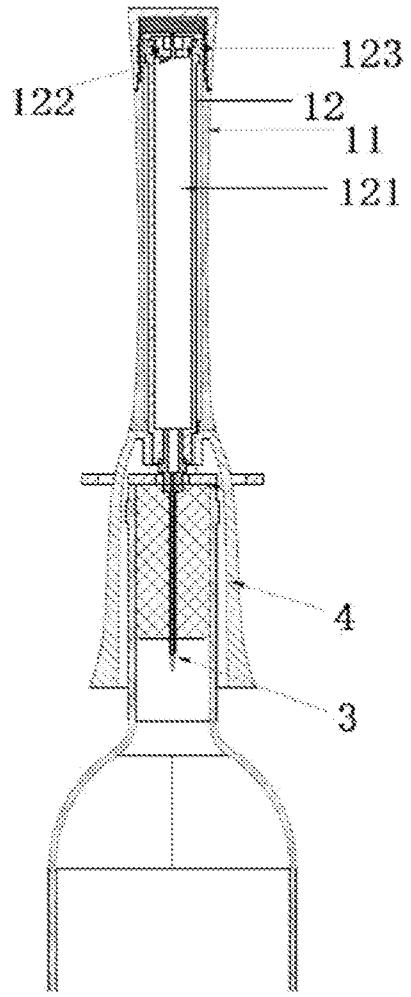
FIG. 1 is a schematic structure diagram of the existing air pressure opener.

The parts are numbered as: housing 1, outer housing 11, inner housing 12, inner cavity of housing 121, one-way valve 122, piston ring 123, air outlet 124, intake space 13, air pressure relief device 2, venting valve 21, spring 22, seal ring 23, venting hole 24, air needle 3, sleeve of bottle opener 4, stopper 51, wine bottle 52.

EMBODIMENT OF THE PRESENT INVENTION

Figure 2:
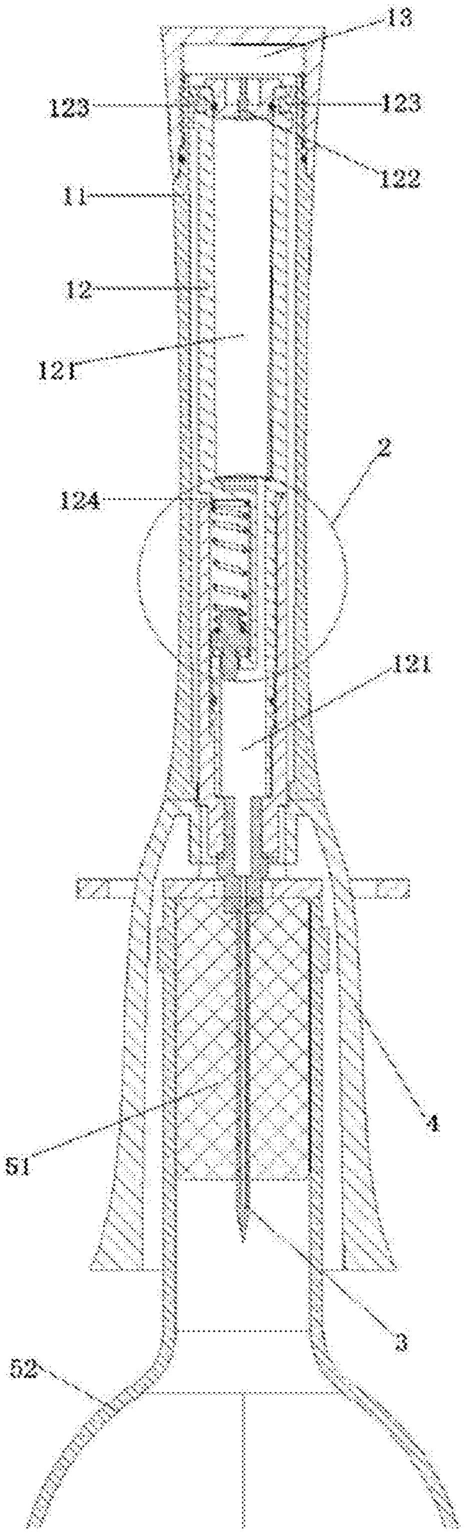
FIG. 2 is a structure diagram of the air pressure opener of the present invention.
Figure 3:
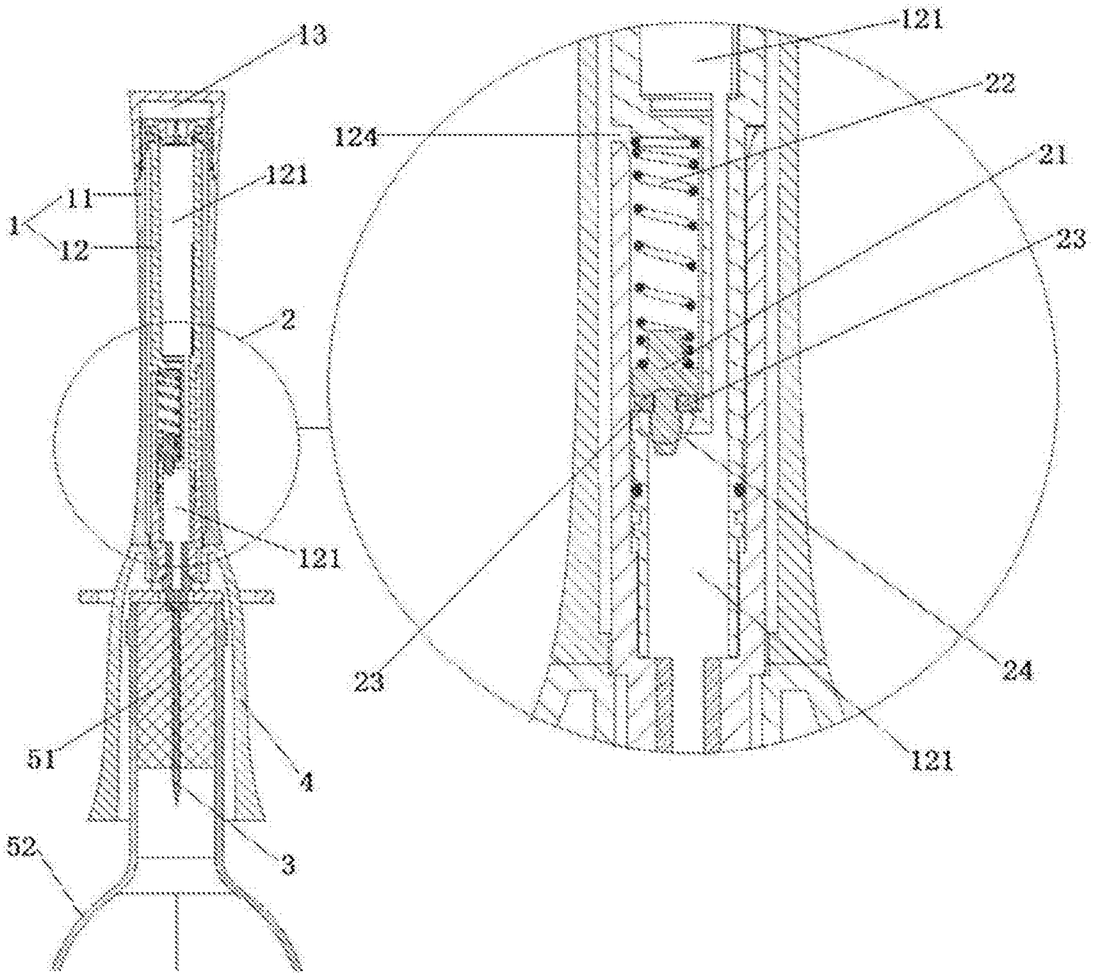
FIG. 3 is an enlarged view of the air pressure relief device of the present invention.
Figure 4:
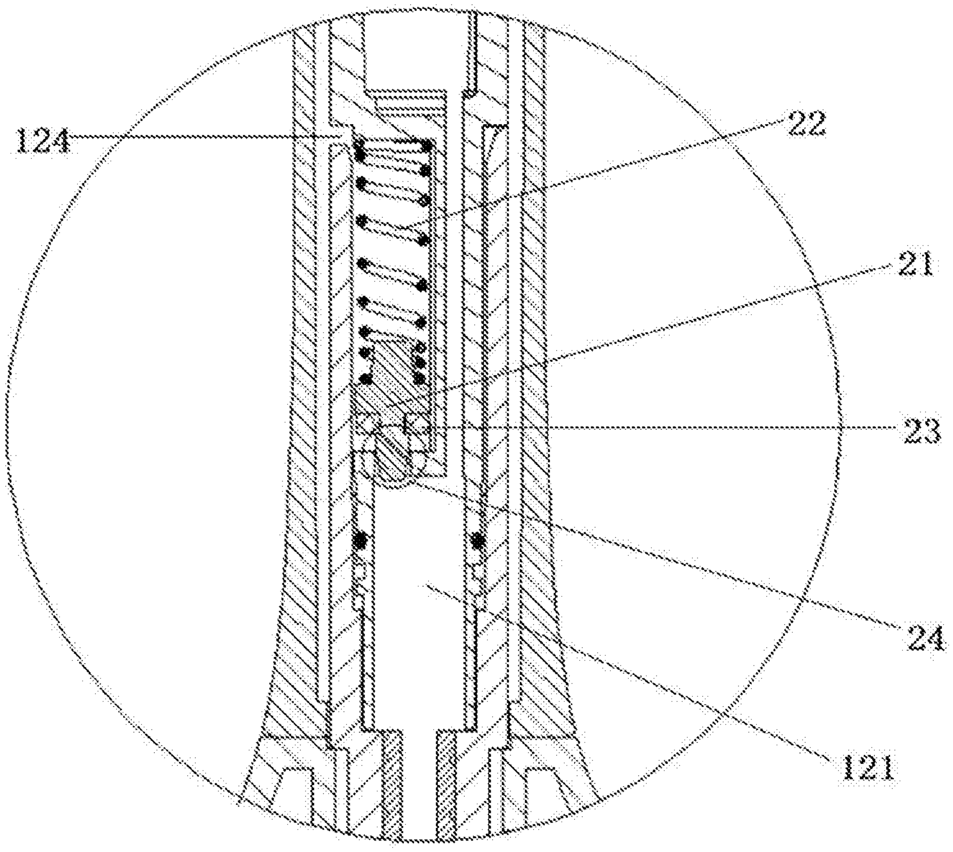
FIG. 4 is a partially enlarged schematic diagram of the air relief device of the present invention.
Figure 5:
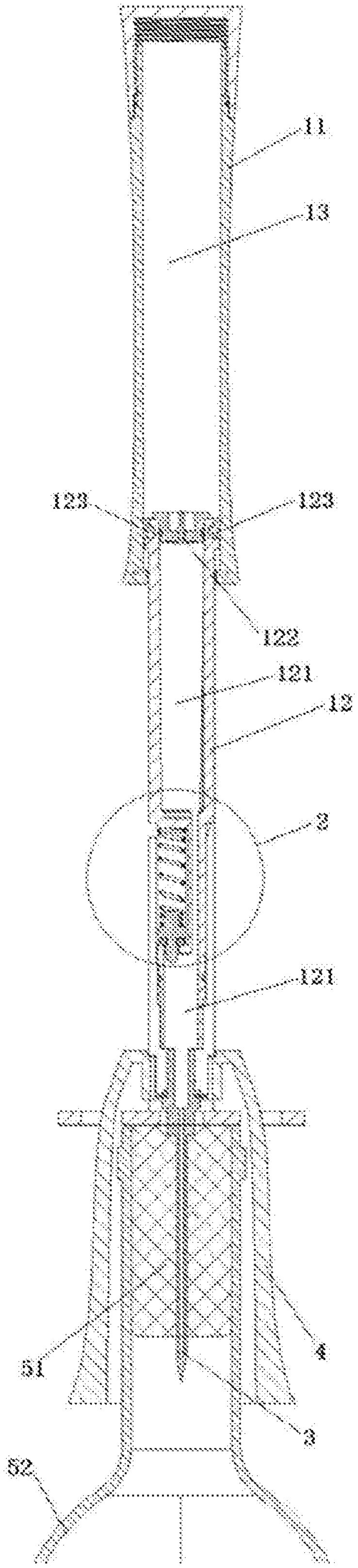
FIG. 5 is a schematic diagram of the air pressure opener of the present invention when it starts to work and the air is being pumped into the opener.
Figure 6:
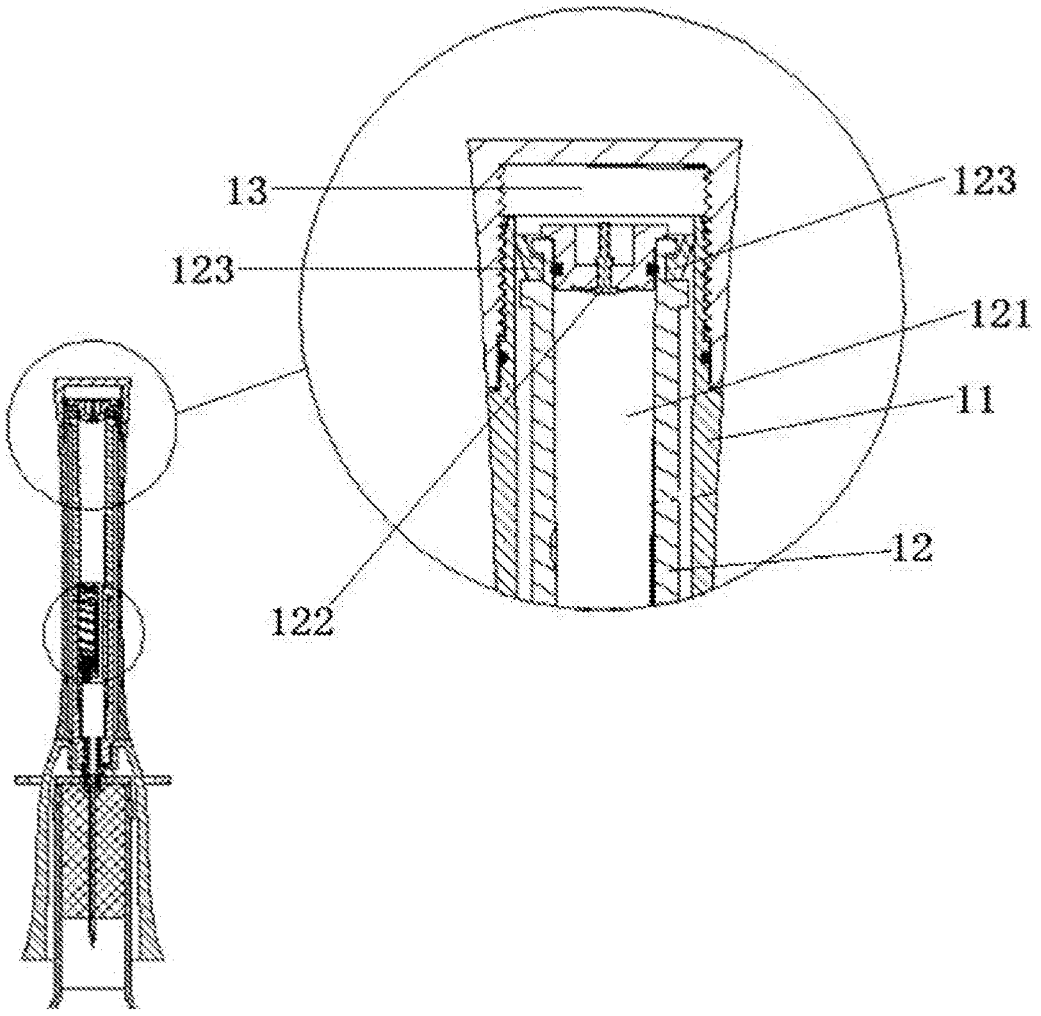
FIG. 6 is a partial enlarged view between the top of the inner housing and the outer housing of the air pressure opener of the present invention.

The present invention is further described in detail with reference of the drawings as below. Referring to FIGS. 1-5, an air pressure opener for opening grape wine bottle comprises a housing 1 and a pumping device for filling air into a wine bottle. The pumping device comprises an inner cavity 121 of the housing and an air needle 3 with an air channel. The air needle 3 connects to the inner cavity 121 of the housing, and the air channel in the air needle 3 connects to the inner cavity of the housing 121. An air pressure relief device 2 is provided in the inner cavity of the housing 121. When the air pressure in the inner cavity of the housing rises from atmospheric pressure value to a certain value, the air pressure relief device 2 can vent the air in the inner cavity of the housing 121. The technical effect of this solution is that an air pressure relief device 2 is provided in the air pressure opener. When the bottle is being opened, the pressure in the wine bottle 52 is high. There can be an danger of bottle explosion due to excessive pressure in the wine bottle 52 if the stopper 51 has not been opened and the air is still being pumped in at this time. With the air pressure relief device 2, the air pressure relief device 2 releases the air in the wine bottle 52 in time to prevent the wine bottle from bursting.

As an improvement, the air pressure relief device 2 comprises a venting valve 21, a spring 22, a sealing ring 23, and a venting hole 24. The venting valve 21 is fixedly installed at the bottom of the spring 22. Preferably, the spring 22 in this solution is a spring with a certain elastic strength to prevent the venting valve 21, which is installed at the bottom of the spring 22, from being easily pushed up by the air pressure in the inner cavity 121 of the housing. The venting hole 24 is provided at the bottom of the air pressure relief device 2 and a sealing ring 23 is provided at the bottom of the venting valve 21. When the air pressure in the inner cavity 121 does not reach to the value that can push the venting valve 21 up, the venting valve 21 and the venting hole 24 are tightly fitted through a sealing ring 23 under the elastic force of the spring 22. The seal ring 23 can prevent the air in the inner cavity 121 from flowing through the venting hole 24 into the atmosphere. When the air pressure in the inner cavity 121 reaches the value that can push up the venting valve 21, the spring 22 is compressed. And then the venting valve 21 is pushed up, with the venting hole 24 being opened, under the air pressure inside the inner cavity 121. The the air into the inner cavity 121 is released to the atmosphere by this way. When the wine bottle 52 is being opened, the air needle 3 is inserted into the wine bottle 52. At this time, the inner cavity 121 of the housing is in a state of communicating the air with the wine bottle 52 through the air needle 3. The air pressures in the inner cavity 121 and the wine bottle 52 are the same. A large amount of air can be filled into the wine bottle 52 when the air pumping device works. When the air pressure in the bottle 52 is high and the stopper 51 is not being pushed out, the wine bottle 52 can be in a risk of bursting due to the excessive pressure inside if the air is still being pushed in the wine bottle 52. In the present invention, the pressure in the inner cavity 121 of the housing is high enough to push up the venting valve 21 at this time. Then, the venting valve 21 and the venting hole 24 are opened (see FIG. 4). A space is formed and a certain amount of air is vented: the air in the inner cavity 121 follows into the atmosphere through the venting hole 24 and the air outlet 124. Since the air pressure inside the wine bottle 52 no longer rises at this time being, the danger of the wine bottle 52 bursting is avoided.

A further improvement, the housing 1 comprises an outer housing 11 and an inner housing 12, a piston ring 123 arranged between a top side wall of the inner housing 12 and the outer housing 11. A one-way valve 122 is provided on the top of the inner housing. When the air pressure opener works, an air intake space 13 is formed between the top of the inner housing 12 and the outer housing 11. A piston ring 123 is used to control the air flowing into the air intake space 13, and a one-way valve 122 is used to control the direction of the air flowing into the housing cavity 121 and make the air goes in one direction only. The specific embodiment is as follows: pull the housing 11 upward (see FIG. 5) so that the air can enter the intake space 13 through the piston ring 123. Then press the outer housing 11 downward (see FIG. 2) and the piston ring 123 is closed. The air in the intake space 13 enters the inner cavity of the housing 121 through the one-way valve 122. The inner cavity of the housing 121 connects to and communicate the air with the wine bottle 52 through the air needle 3. By this way, the air is filled into the wine bottle 52 if the housing 11 repeatedly moves upward or downward (see FIG. 5 and FIG. 2). If the wine bottle 52 is continuously filled with the air, the stopper 51 is ejected.

A further improvement, the air pressure relief device 2 is disposed at a side wall of the inner cavity of the housing 121. The side wall of the inner housing 12 is provided with an air outlet 124, and the air pressure relief device 2 connects to and communicates the air with outlet 124.

A further improvement, a sleeve 4 is provided at the bottom of the air pressure opener 4. The air needle 3 is provided on the sleeve of the air pressure opener 4 and the sleeve 4 is set at the bottle mouth. When the bottle is being opened, the air needle 3 goes through the stopper 51 and into the wine bottle 52. In this case, the sleeve of bottle opener 4 is set on the wine bottle 52 to make the bottle opening process being more stable.

The embodiment mentioned above only shows part of the implementation manners of the present invention. They should not be understood as a limitation to the scope of the patent of the present invention. It should be noted that the modifications and improvements, which come from the concept of the present invention for the ordinary technicians in this field, fall into the protection scope of the present invention. The protection scope of the invention patent shall be subject to the claims.

The invention claimed is:

1. An air pressure opener for opening a wine bottle comprising:
- a housing;
- an air pumping device for filling air into the wine bottle, the air pumping device comprising:
  - an inner cavity of the housing; and
  - an air needle that connects to the inner cavity of the housing, the air needle having an air channel inside that connects to the inner cavity of the housing; and
- an air pressure relief device in the inner cavity of the housing comprising:
  - a spring;
  - a venting valve fixedly installed at a bottom of the spring;
  - a sealing ring provided at the bottom of the venting valve; and
  - a venting hole provided at the bottom of the air pressure relief device;
- wherein when a value of air pressure in the inner cavity of the housing rises from atmospheric pressure to a certain value, the air pressure relief device releases the air pressure in the inner cavity of the housing;
- wherein the venting valve tightly fits the venting hole through the sealing ring under the action of a spring force when the air pressure value of the inner cavity of the housing does not reach a value capable of ejecting the venting valve;
- wherein the spring is compressed and the venting valve and the venting hole are opened under the air pressure of the inner cavity of the housing when the air pressure value of the inner cavity of the housing reaches a value capable of ejecting the venting valve, to release the air pressure in the inner cavity of the housing;
- wherein the air pressure relief device is disposed on a side wall of the inner cavity of the housing;
- wherein a side wall of the inner housing further comprises an air outlet; and
- wherein the air pressure relief device communicates the air to the atmosphere through the air outlet;
- wherein the housing further comprises:
  - an outer housing;
  - an inner housing having a top side wall;
  - a piston ring arranged between the top side wall of the inner housing and the outer housing; and
  - a one-way valve on the top of the inner housing.

2. The air pressure opener for opening the wine bottle according to claim 1, wherein an air intake space is formed between the top of the inner housing and the outer housing when the bottle opener is used to open the wine bottle;

wherein the piston ring controls the air flowing into the air intake space; and wherein the one-way valve controls the air flowing into the inner cavity of the housing in one direction.

3. The air pressure opener for opening the wine bottle according to claim 1, further comprising a sleeve located at the bottom of the bottle opener;

wherein the air needle is accommodated in the sleeve of bottle opener;

wherein when the wine bottle is being opened, the bottle opener is set on a mouth of the wine bottle and the air needle is inserted into the wine bottle through a bottle stopper.

4. An air pressure opener for opening a wine bottle comprising:

a housing comprising:

an outer housing;

an inner housing having a top side wall;

a piston ring arranged between the top side wall of the inner housing and the outer housing; and a one-way valve on the top of the inner housing;

an air pumping device for filling air into the wine bottle, the air pumping device comprising:

an inner cavity of the housing; and an air needle that connects to the inner cavity of the housing, the air needle having an air channel inside that connects to the inner cavity of the housing; and an air pressure relief device in the inner cavity of the housing comprising;

a spring;

a venting valve fixedly installed at a bottom of the spring;

a sealing ring provided at the bottom of the venting valve; and a venting hole provided at the bottom of the air pressure relief device wherein when the value of air pressure in the inner cavity of the housing rises from atmospheric pressure to a certain value, the air pressure relief device releases the air pressure in the inner cavity of the housing;

wherein the venting valve tightly fits the venting hole through the sealing ring under the action of the spring force when the air pressure value of the inner cavity of the housing does not reach a value capable of ejecting the venting valve;

wherein the spring is compressed and the venting valve and the venting are opened under the air pressure of the inner cavity of the housing when the air pressure value of the inner cavity of the housing reaches a value capable of ejecting the venting valve, to release the air pressure in the inner cavity of the housing;

wherein an air intake space is formed between the top of the inner housing and the outer housing when the bottle opener is used to open the wine bottle;

wherein the piston ring controls the air flowing into the air intake space; and wherein the one-way valve controls the air flowing into the inner cavity of the housing in one direction;

wherein the air pressure relief device is disposed on a side wall of the inner cavity of the housing;

wherein a side wall of the inner housing further comprises an air outlet; and wherein the air pressure relief device communicates the air to the atmosphere through the air outlet.

* * * * *